United States Patent [19]
Liggett

[11] Patent Number: 5,954,388
[45] Date of Patent: Sep. 21, 1999

[54] TRUCK SLICKER

[76] Inventor: Robert M. Liggett, 4725 Harvey St., Muskegon, Mich. 49444

[21] Appl. No.: 08/820,963

[22] Filed: Mar. 19, 1997

[51] Int. Cl.[6] .................................................. B60J 11/00
[52] U.S. Cl. ............................................. 296/136; 296/98
[58] Field of Search .............................. 296/95.1, 98, 136

[56] References Cited

U.S. PATENT DOCUMENTS

| | | | |
|---|---|---|---|
| 1,219,735 | 3/1917 | Harvey | 296/136 |
| 1,719,055 | 7/1929 | Herzer | 135/88.13 |
| 1,733,007 | 10/1929 | Dahl | 135/88.07 |
| 1,912,231 | 5/1933 | Wandscheer | 150/166 |
| 1,918,423 | 7/1933 | Persinger | 160/24 |
| 1,999,171 | 4/1935 | Bryant | 150/166 |
| 2,646,097 | 7/1953 | Gaverth et al. | 150/166 |
| 2,723,156 | 11/1955 | Stanziale | 296/98 |
| 2,724,395 | 11/1955 | Valentine | 296/98 |
| 2,871,931 | 2/1959 | Hastings | 160/21 |
| 3,021,894 | 2/1962 | LaDue | 160/23.1 |
| 3,050,075 | 8/1962 | Kaplan et al. | 296/98 |
| 3,222,102 | 12/1965 | Lucas | 296/136 |
| 3,563,594 | 2/1971 | London | 293/128 |
| 3,992,053 | 11/1976 | Hrytzak et al. | 135/88.05 |
| 4,118,066 | 10/1978 | Ricke | 297/184.11 |
| 4,171,145 | 10/1979 | Pearson, Sr. | 296/78.1 |
| 4,324,427 | 4/1982 | Huang et al. | 293/106 |
| 4,432,581 | 2/1984 | Guma | 296/136 |
| 4,657,298 | 4/1987 | Yong O | 296/136 |
| 4,718,711 | 1/1988 | Rabbit | 296/136 |
| 4,720,135 | 1/1988 | Farina | 296/136 |
| 4,727,898 | 3/1988 | Guma | 135/87 |
| 4,732,421 | 3/1988 | Ross et al. | 296/136 |
| 4,764,998 | 8/1988 | Norris et al. | 4/502 |
| 4,834,446 | 5/1989 | Tung-Chow | 296/136 |
| 4,848,823 | 7/1989 | Flohr et al. | 296/98 |
| 4,856,842 | 8/1989 | Ross et al. | 296/136 |
| 4,858,985 | 8/1989 | Wojcik | 296/136 |
| 4,923,240 | 5/1990 | Swanson | 296/100.18 |
| 4,929,016 | 5/1990 | Kastanis | 296/136 |
| 4,958,881 | 9/1990 | Piros | 296/98 |
| 4,971,384 | 11/1990 | Baldwin | 296/98 |
| 4,991,640 | 2/1991 | Verkindt et al. | 160/368.1 |
| 5,022,700 | 6/1991 | Fasiska et al. | 296/98 |
| 5,029,933 | 7/1991 | Gillem | 296/136 |
| 5,056,839 | 10/1991 | Yoon | 293/117 |
| 5,078,330 | 1/1992 | Hall | 242/390.8 |
| 5,078,446 | 1/1992 | Walter | 296/98 |
| 5,088,788 | 2/1992 | Moulton | 296/136 |
| 5,165,461 | 11/1992 | Haddad, Jr. | 160/265 |
| 5,176,421 | 1/1993 | Fasiska | 296/136 |
| 5,179,991 | 1/1993 | Haddad, Jr. | 160/310 |
| 5,294,170 | 3/1994 | Hsueh | 296/180.1 |
| 5,378,035 | 1/1995 | Wu | 296/136 |
| 5,462,329 | 10/1995 | Cheng | 296/98 |
| 5,472,257 | 12/1995 | Kaya | 296/136 |
| 5,503,212 | 4/1996 | Lin | 160/370.22 |
| 5,567,002 | 10/1996 | Tair | 296/136 |

*Primary Examiner*—Andrew C. Pike
*Attorney, Agent, or Firm*—Price, Heneveld, Cooper, DeWitt and Litton

[57] ABSTRACT

A pickup truck cab protective slicker assembly has an elongated housing positionable transversely of a pickup truck cargo box immediately behind the pickup truck cab and on the forward wall of the box. The assembly has an elongated upper outlet over its length, a flexible protective cover spring wound in the housing and extensible through the opening, an elongated latch bar on the leading edge of the cover, including a handle for pulling the cover out of the housing and over the cab and hood, latch orifices in the latch bar, and bracket studs attachable to the truck at the front of the hood, positioned and oriented to engage the latch orifices for releasably retaining the cover over the cab and hood.

10 Claims, 4 Drawing Sheets

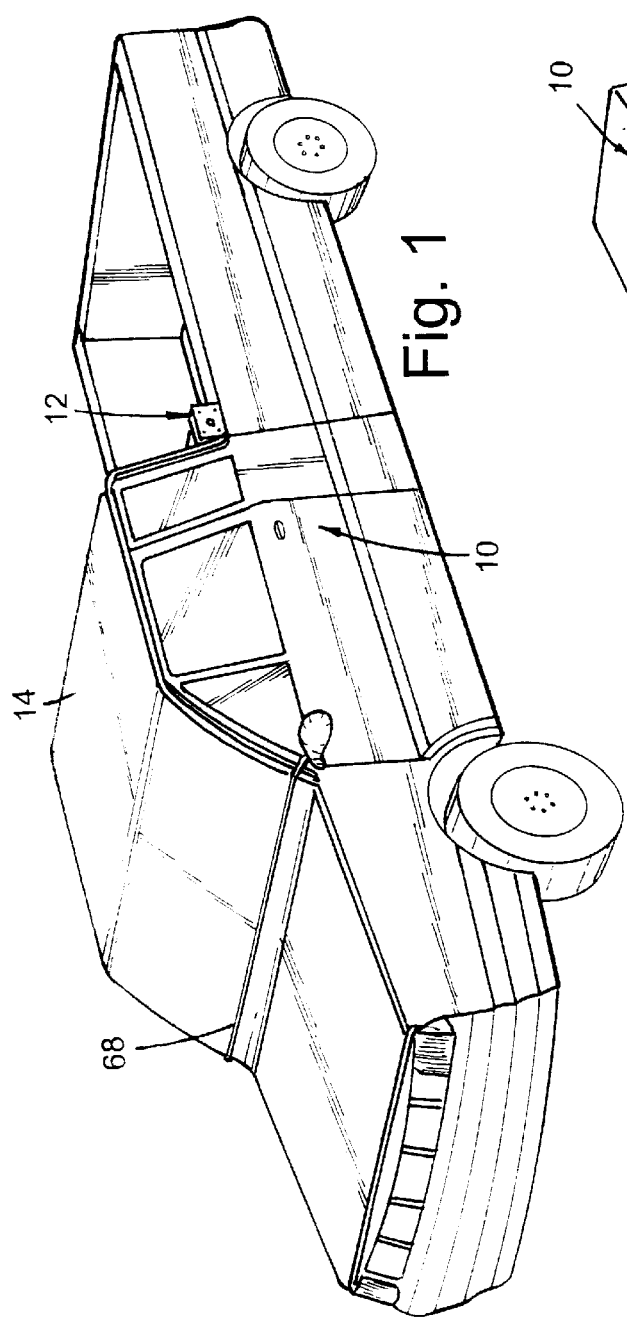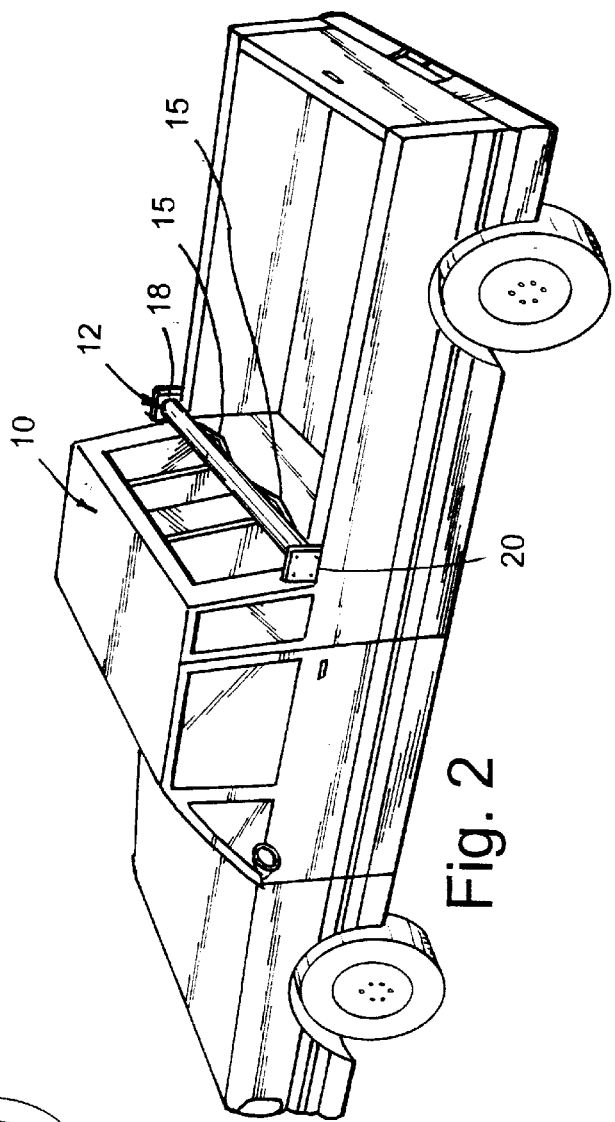

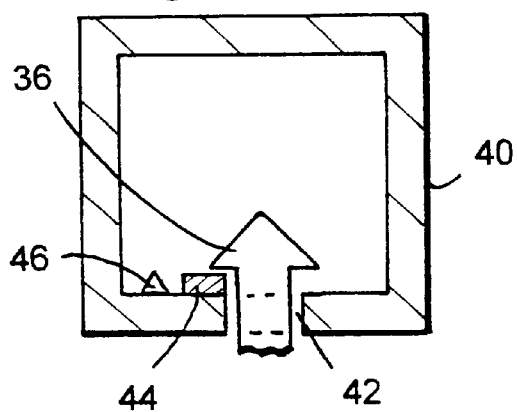
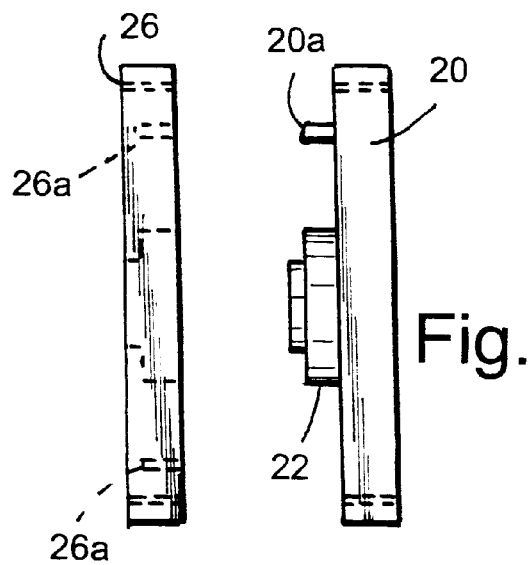
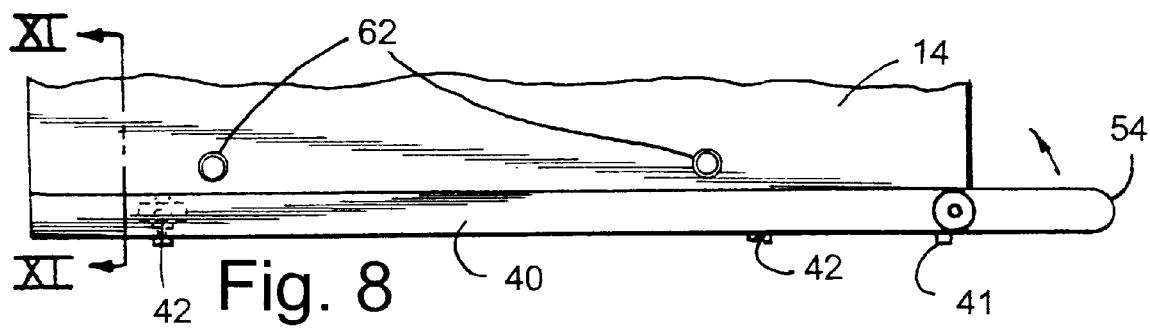

TRUCK SLICKER

BACKGROUND OF THE INVENTION

This invention relates to a pickup truck protective slicker assembly, and particularly to such an assembly including a cover extensible and securable over the cab and hood of a truck, and retractable to an enclosed position out of sight and nondisruptive of and invulnerable to the cargo load.

Protective covers for automobiles have been proposed in a variety of forms and styles, such as shown, for example, in U.S. Pat. Nos. 4,720,135; 4,718,711; 5,503,212; 5,472,257; 5,567,002; 4,732,421; and others. Typically, it is proposed to mount such covers at the rear or the front bumper, or even on the top as in U.S. Pat. No. 1,999,171.

In recent years, pickup trucks have become favored vehicles, since these vehicles are capable of not only transporting people in the cab but also cargo in the box. Recent pickup truck vehicles are not just rough, plain vehicles as in the past, however, but costly and highly attractive vehicles often used for family purposes. It is desirable to have some mechanism for protecting the cab and hood of these costly pickup trucks when not in use. However, the protective device used must be stored in such a manner as to not interfere with the cargo hauling capacity of the truck, and not vulnerable to damage by the cargo.

SUMMARY OF THE INVENTION

One object of this invention is to provide a pickup cab protective slicker cover assembly mounted in a compact form between the cargo box and the back of the cab. The cover is extensible to cover the cab and hood of the truck, retainable in the extended condition by attachment to a bracket on the vehicle body, retractable to a protected position not covering any portion of the cab, and not interfering with or vulnerable to damage by the cargo in the cargo hauling box of the truck.

The cover is flexible and has a retraction and storage housing mounted on the upper ledge of the forward wall of the cargo box, behind the cab, to allow the cover to be stored neatly and in covered condition, extensible up over the cab and hood, and securable to a bracket attachment at the front of the hood, specifically to a connector attached to the truck body above the grill and extending slightly forwardly of the hood rest plate.

The flexible cover is held against the windshield by an adjustable tensioning band with two attached J-hooks for securing to both exterior side mirrors.

The cover is also partially extensible to cover just the rear window portion of the cab, as for emergency indicia use, as retained by interfit with hooks, e.g., on suction cups or equivalent attachment units, above the cab rear window.

Another object is to provide a truck bonnet assembly, the housing of which has a spring tension adjuster at the end plate, and a closure lid spring biased to the closed position for protection of the cover. The lid has a wiper bar for cleaning the cover during retraction.

It is also preferable to not only be extensible to cover the cab and hood, but alternately extensible rearwardly over the truck box and attachable to removable connectors at the rear tailgate of the cargo box so as to protect cargo if desired.

These and other features, advantages and objects of the present invention will be further understood and appreciated by those skilled in the art by reference to the following specification, claims and appended drawings.

BRIEF DESCRIPTION OF THE DRAWINGS

FIG. 1 is a perspective view of a pickup truck from the front, shown with the novel cover extended over the cab and hood and secured at the grill;

FIG. 2 is a rear perspective view of the truck and cover assembly in FIG. 1, with the cover retracted into its housing;

FIG. 7 is an edge elevational view of the rotational end plate coupling;

FIG. 8 is a plan view of the leading edge of the protective cover, showing the transverse latch bar and the manual handle;

FIG. 11 is a sectional elevational view taken along line XI—XI.

DESCRIPTION OF PREFERRED EMBODIMENT

Figure 6:
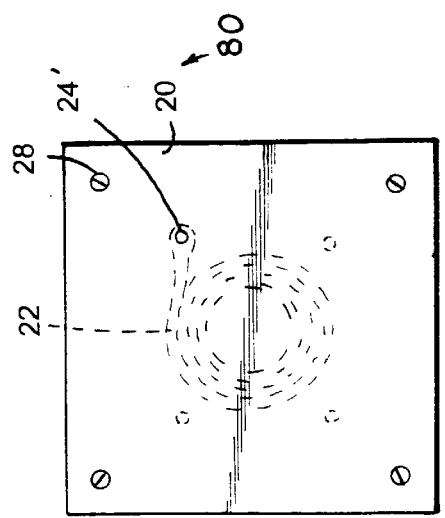
FIG. 6 is an end elevational view of the rotatable end plate coupling on one end of the housing, and the attached coil spring in the housing.
Figure 5:
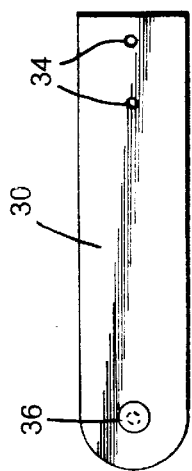
FIG. 5 is a plan view of one of the securing brackets.
Figure 4:
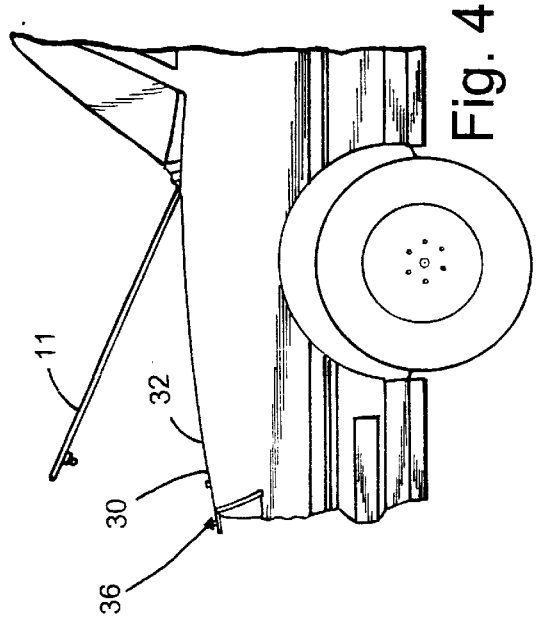
FIG. 4 is a fragmentary side elevational view of the front end of the pickup truck with the hood raised and with the front securing brackets fastened in place.
Figure 3:
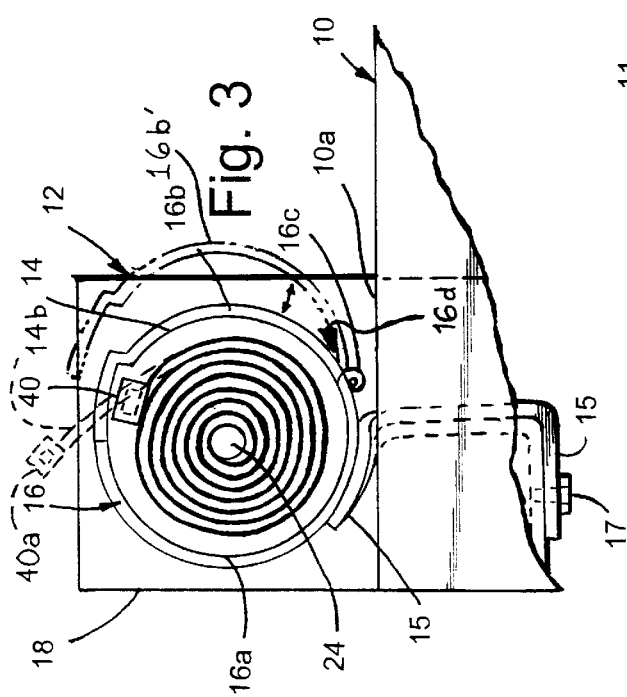
FIG. 3 is an enlarged elevational view of the assembly mounted on the forward edge of the box, and shown with an end plate removed from the housing for viewing of the interior.

Referring now specifically to the drawings, the pickup truck 10 there shown has the novel slicker cover assembly 12 mounted thereon, including a flexible, extensible cover element 14 extended over the cab and hood of the truck and latched at the front end thereof in the manner to be described. This cover is made of any of known fabrics which will deflect solar rays from the rear window, the front windshield and the top and hood of the truck, and protect them from the weather. It has a width approximately that of the truck, or slightly greater. The protective slicker cover assembly 12 includes an elongated housing 16 (FIG. 3) which is mounted on the upper ledge 10a of the front wall of the truck box with a pair of L-shaped brackets 15 (FIGS. 2 and 3) bolted or riveted to housing 16 and bolted to the underside of the reinforcing upper ledge of the box by fasteners 17. The housing 16 is basically cylindrical in configuration, being formed of a first elongated shell element 16a which is affixed at its ends to end plate 18 and plate 26. The other elongated shell element 16b is pivotally connected at hinge 16c to the fixed shell element 16a so that shells 16a and 16b complete the hollow housing or is in position 16b' forming an outlet, and in use, the elongated latch bar 40 and cover element 14 are pulled through the outlet as shown in FIG. 3 40a, 14b. A coil spring 16d at hinge 16c biases element 16b to its closed position depicted in FIG. 3. Alternatively, the cover element 16b can be pivoted to an open position to allow the cover 14 to freely unwind from its coiled retracted condition in housing 16 to its extended condition depicted in FIG. 1. Cover 14 is biased to its retracted coiled condition in housing 16 by a coil spring 22 (FIGS. 6 and 7). Coil spring 22 has one end anchored to central spindle 24 which extends through the coiled cover in housing 16. The other end of spring 22 is anchored to end plate element 20 at anchor pin 24. End plate element 20 cooperates with adjacent end plate element 26 to which one end of housing 16 is attached. End plate 20 includes one or more anchor pins 20a while end plate 26 includes a plurality, such as four, of receiving recesses 26a to alternately receive anchor pin 20a. The two plates are secured together by suitable fasteners 28. The tension on coil spring 22 can be increased or decreased by removing the fasteners and rotating plate 20 relative to plate 26, and then fixing these two together again in a particular rotated position by inserting anchor pin 20a into an appropriate aligned recess 26a. Thus, if, after time, spring 22 loses some of its recoiling capacity, it can be adjusted by these two plates to an increased recoiling capacity the spring recoils counterclockwise 80.

At the front end of the truck, above the grill, is mounted a pair of laterally spaced flat brackets 30 as of metal or plastic. These brackets can be mounted forward of the radiator cover plate, i.e., at the hood rest plate, by fasteners 32 through orifices 34. These brackets fit nicely under the closed hood 11 of the truck 10 while extending forwardly slightly in front of the hood. Each one includes an upstanding projection 36 having an enlarged head.

Figure 10:
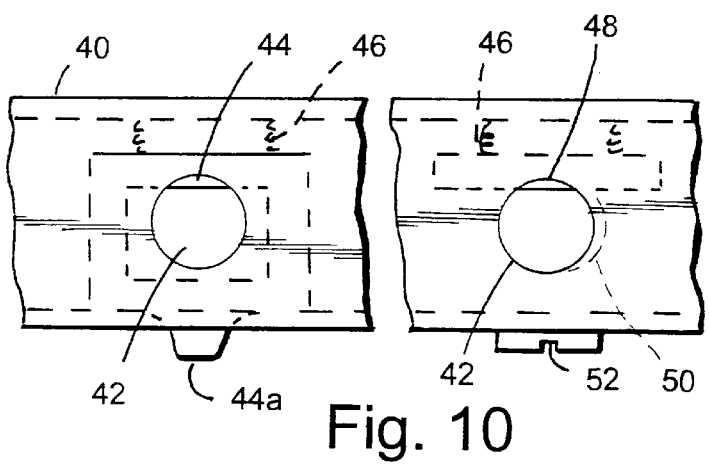
FIG. 10 is a fragmentary enlarged plan view of the latch bar.

At the leading edge of cover 14 is an elongated latch bar 40 as of high impact plastic. This latch bar extends across the width of cover 14 and includes a pair of orifices 42 capable of fitting down over the projections 36. This latch bar is preferably hollow, having a rectangular cross-sectional configuration (FIG. 10) or the like. The interengagement of projections 36 and orifices 42 (FIG. 11) is secured by having internal latch members engage beneath the enlarged heads of projections 36. An example of such a latch member is shown at FIG. 10 by plate 44 biased by springs 46 to an extended condition to intersect part of opening 42. This plate can be shifted back against the bias of springs 46 out of opening 42 as by a push button 44a extending through the opposite face of latch bar 40. Optionally, the second opening 42 can have a latch plate 48 which is also biased to its extended position by springs 46, but is actuated by a key operated cam 50 rotatable by a key in key slot 52 to depress latch plate 48 out of opening 42 against the bias of springs 46. Pivotally mounted to one end of latch bar 40 is a manual handle 54 which can serve the dual purpose of enabling the leading edge of the cover to be readily grasped and extended from the housing 16 up over the cab and over the length of the hood of the truck and fastened in place at the projections 36. Its rotation is limited by a stop 41 (FIG. 8). The handle serves the second purpose of being pivotable over the top of key slot 52 at opening 42 (see FIG. 8) for security purposes. The flexible cover is held against the windshield by an adjustable tensioning band 68 with two attached J-hooks for securing to both exterior side mirrors.

Figure 9:
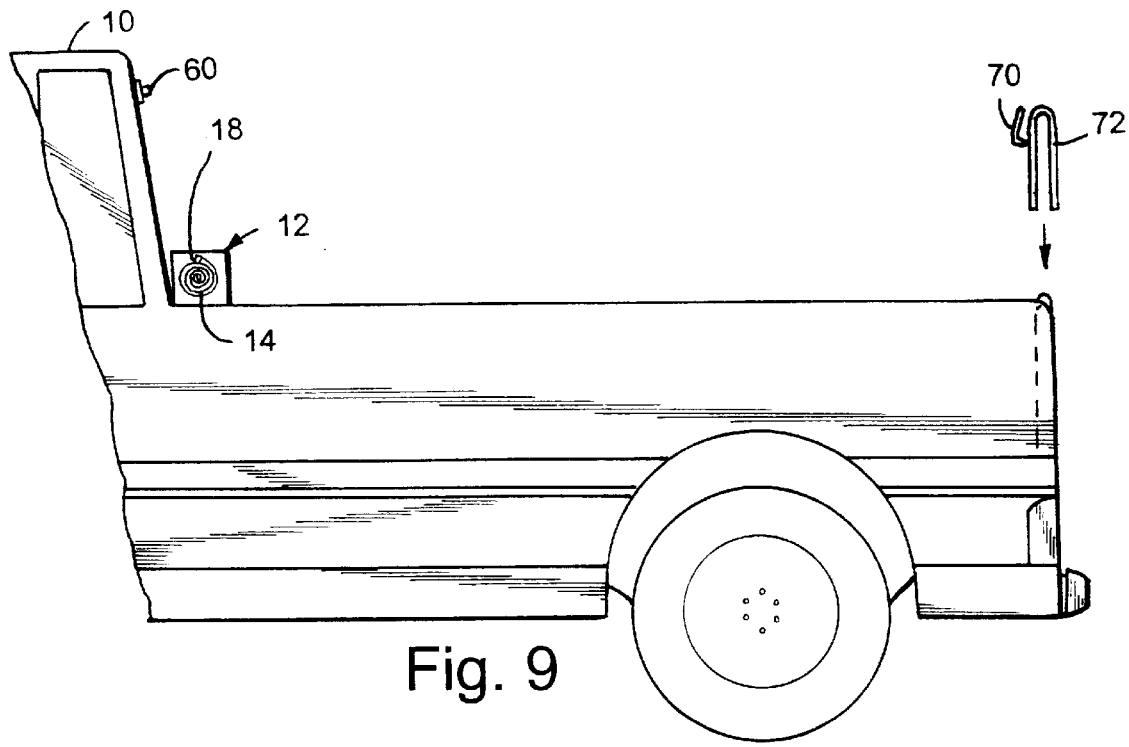
FIG. 9 is a fragmentary side elevational view of the rear portion of the truck showing removable attaching elements at the tailgate.

A secondary use of the protective cover can be to summon assistance in the event of vehicle failure. For this purpose, a pair of mountable hooks 60 (FIG. 9) are attached as by suction cups to the rear of the cab above the rear window. These hooks cooperate with a pair of grommets or orifices 62 (FIG. 8) near the leading edge of the cover to hold a portion of the cover extended up from the housing. This portion of the cover could include indicia such as "HELP", "DISABLED VEHICLE", or the equivalent, as is desired.

The cover could also be utilized to cover the bed of the pickup truck, the rearwardly extended cover leading edge being connected to hooks 70 on a pair of slide brackets 72 attached to the tailgate either temporarily or permanently, as needed. The inner faces of the inverted U-shaped slide brackets are polymer coated to protect the tailgate paint, and for friction. Hooks 70 could be positioned to interfit with grommets 62, or with latch bar openings 42.

When the cover is retracted into housing 16, the latch bar could be placed inside housing 16 by opening member 16b temporarily, and then closing the housing. Alternatively, the latch bar plus the pivotal housing cover 16b could cover the opening from which the cover 14 extends (FIG. 3) to minimize moisture entry due to inclement weather. The housing receptacle preferably has bottom weep holes to allow excess moisture to drain. Since the cover assembly is mounted on the front ledge 10a of the pickup truck box (FIG. 3) immediately behind the cab, the cover assembly, whether in use or not in use, does not interfere with the cargo carrying capacity of the pickup truck. Nor is it vulnerable to damage from the cargo. It is basically unobstructive and does not detract from the appearance or use of the truck.

The above description is considered that of the preferred embodiment only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

The embodiments of the invention in which an exclusive property or privilege is claimed are defined as follows:

1. A pickup truck cab protective slicker cover assembly comprising:

an elongated housing positionable transversely of a cargo box of a pickup truck immediately behind a cab of the pickup truck and on a forward edge of the box, having an elongated upper outlet over a length thereof;

a flexible protective slicker cover wound in said housing and extensible through said outlet;

an elongated latch bar on a leading edge of said cover, including a handle for pulling said cover out of said housing and over said cab and a hood;

latch orifices in said latch bar; and bracket studs attachable to the truck at the front of the hood, positioned and oriented to engage said latch orifices for releasably retaining said slicker cover over said cab.

2. The pickup truck cab protective slicker cover assembly in claim 1 further including an elongated pivotal shell element shiftable over said outlet to close said outlet, or away from said outlet to open said outlet.

3. The pickup truck cab protective slicker cover assembly in claim 1 further including a windup spring in said housing for coiling said cover in said housing.

4. The pickup truck cab protective slicker cover assembly in claim 3 wherein said spring is rotatably adjustable in said housing.

5. The pickup truck cab protective slicker cover assembly in claim 4 wherein said housing further includes interlocking end plate elements with one said end plate element having a spring retainer attached to said spring in said housing, and being rotatable to a different selected position for increasing tension on said spring.

6. The pickup truck cab protective slicker cover assembly in claim 5 wherein said interlocking end plate elements are engageable and disengageable with each other.

7. The pickup truck cab protective slicker cover assembly in claim 1 wherein said pivotal shell element is spring biased to a closed position.

8. The pickup truck cab protective slicker cover assembly in claim 1 wherein said studs have enlarged heads for retention of said orifices.

9. The pickup truck cab protective slicker cover assembly in claim 8 wherein said orifices are releasable from said studs.

10. The pickup truck cab protective slicker cover assembly in claim 9 further including releasable latch elements at said orifices.

* * * * *